United States Patent [19]

Pawletko

[11] Patent Number: 4,733,177

[45] Date of Patent: Mar. 22, 1988

[54] HIGH RESOLUTION HIGH OUTPUT MAGNETO RESISTIVE TRANSDUCER FOR DETERMINING STATIC AND DYNAMIC POSITION

[75] Inventor: Joseph P. Pawletko, Endwell, N.Y.

[73] Assignee: International Business Machines Corporation, Armonk, N.Y.

[21] Appl. No.: 11,817

[22] Filed: Feb. 6, 1987

Related U.S. Application Data

[63] Continuation of Ser. No. 695,975, Jan. 29, 1985, abandoned.

[51] Int. Cl.$^4$ .................... G01B 7/14; G01R 33/06; H01L 43/08
[52] U.S. Cl. .................................. 324/207; 324/251; 307/309; 338/32 R
[58] Field of Search ............... 324/207, 208, 173, 174, 324/251; 338/32 R; 307/309

[56] References Cited

U.S. PATENT DOCUMENTS 3,863,235 1/1975 McKee et al. ...................... 324/207
3,900,814 8/1975 Masuda ................................ 324/208

OTHER PUBLICATIONS

Nemier et al., "Transducer Pickup", *IBM Technical Disclosure Bulletin*, vol. 19, No. 4, 9/1977, pp. 1197–1198.

Primary Examiner—Reinhard J. Eisenzopf
Assistant Examiner—Walter E. Snow
Attorney, Agent, or Firm—Mark Levy

[57] ABSTRACT

A high resolution positioning sensor having a magnetic field generator, a device connected to the magnetic field generator for concentrating lines of magnetic flux produced by the magnetic field generator, and a magneto resistive element connected to the concentrating device. The magneto resistive element is adapted to change resistive properties as a function of magnetic flux density. A reference position scale is also provided, having a transducer grid with a number of protuberances. Two flux couplers are connected to the magneto resistive element and are arranged out of phase with one another with respect to the protuberances of the transducer grid. These flux couplers modulate flux distribution between the concentrating device and the transducer grid.

5 Claims, 6 Drawing Figures

HIGH RESOLUTION HIGH OUTPUT MAGNETO RESISTIVE TRANSDUCER FOR DETERMINING STATIC AND DYNAMIC POSITION

This application is a continuation of application Ser. No. 06/695,975 filed Jan. 29, 1985 and none abandoned.

BACKGROUND OF THE INVENTION

The present invention relates to a high resolution sensor for detecting relative position and in particular to a high resolution positioning sensor incorporating electrical and magnetic principles.

In the field of precision mechanical movements and machine positioning, it is becoming more important to determine relative position accurately and quickly. The relative position of two or more members or parts with respect to one another is especially critical in the fields of material handling, medicine and manufacturing. In the latter case, robotics is playing an ever increasing role.

Manufacturers of highly sophisticated miniature equipment, for example, such as electronic components, printed circuit boards and the like, often require precise relative positioning to within ten thousands of an inch (10 mils) or less. Few systems are now capable of such high resolution, reliable measurements.

Magneto resistive elements, whose electrical resistive characteristics or properties vary as a function of the magnetic flux density to which they are subjected, are well known. U.S. Pat. No. 3,172,032, issued to Hunt, teaches a rudimentary magnetoresistive element in which a servo mechanism is provided to operate in conjunction with a magnetic field generator to control the intensity of the magnetic field. The servo mechanism controls excitation current and ultimately the resistance of conductive paths.

U.S. Pat. No. 3,554,169, issued to Wahl et al., describes a fuel injection arrangement for internal combustion engines in which a magnetically sensitive resistor is subjected to a magnetic field that varies in intensity. By varying the resistance value of the magnetically sensitive resistor through variation of the magnetic field, an electronic timing network is varied as a function of a selected operating characteristic. The magnetically sensitive resistor provides a function in the aforementioned patent which is commonly referred to as coupling.

U.S. Pat. No. 3,846,697 issued to Cila et al., discloses a digital pickup for counting gear teeth. A pair of magneto resistors mounted on a permanent magnet sense the gear teeth. The magneto resistors are connected in a bridge circuit, the output of which triggers an IC switch to produce a digital output signal. The magneto resistors are directly mounted to one pole of a permanent magnet. This arrangement results in a relatively strong but coarse magnetic field, unsuitable for use with other magneto resistors due to the tendency for magnetic fields to interfere with one another. Moreover, the magneto resistors are not differential with respect to one another, resulting in coarse overall sensitivity.

U.S. Pat. No. 4,119,911, issued to Johnson, Jr., discloses a displacement transducer in which two toothed members have magnetic poles arranged in alternating sequence. The toothed members are arranged so that a magnetic pole on one of the members is spaced from a magnetic pole of opposite plurality on the other member. A magneto resistive element is held within the air gap between the magnetic poles to intercept magnetic flux lines. The magneto resistive element is in the form of a thin film material which is moved between the permanent magnets. The magneto resistive element has an electrical resistance which is dependent on the angular orientation and magnitude of the flux lines with respect to the element. A bridge circuit is connected to both ends of the magneto resistive element. By measuring the electrical resistance of the magneto resistive element, the angular orientation of the flux lines and the relative displacement of the toothed members can be obtained. The function of the apparatus hereinabove described is similar to that of a strain gage. The limit of resolution in this system is based on mechanical or physical limitations. That is, the dimension of the tooth or the length of the gap between magnetic poles is limited to approximately 8 mils at the present level of technology.

U.S. Pat. No. 3,949,345, issued to Makino et al., discloses a magnetoresistance element having two stripe groups aligned in different directions, requiring precise spacing between the stripe groups and relatively complex circuitry to process electrical information obtained therefrom.

It would be advantageous to provide a high resolution positioning sensor for detecting and measuring the relative position of two or more machine members with respect to one another and with a high degree of reliability and precision.

It would further be advantageous to provide a high resolution positioning sensor using magnetic and electrical principles.

It would further be advantageous to provide a system for measuring relative positions of two or more members with respect to one another with the use of focussed magnetic fields.

It would also be advantageous to provide a system of measurement in which magneto resistive elements are used to detect magnetic fields and to generate an electrical signal in response to the strength thereof.

It would also be advantageous to provide a system for measuring relative positions of members on a linear scale or on a curved scale.

It would also be advantageous to provide a system for positioning one member with respect to another with a high degree of reliability and precision based on a high resolution positioning sensor.

SUMMARY OF THE INVENTION

In accordance with the present invention, there is provided a high resolution positioning sensor having a magnetic field generator, a device connected to the magnetic field generator for concentrating lines of magnetic flux produced by the magnetic field generator, and a magneto resistive element connected to the concentrating device. The magneto resistive element is adapted to change resistive properties as a function of magnetic flux density. A reference position scale is also provided, having a transducer grid with a number of protuberances. Two flux couplers are connected to the magneto resistive element and are arranged out of phase with one another with respect to the protuberances of the transducer grid. These flux couplers modulate flux distribution between the concentrating device and the transducer grid.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

Figure 1:
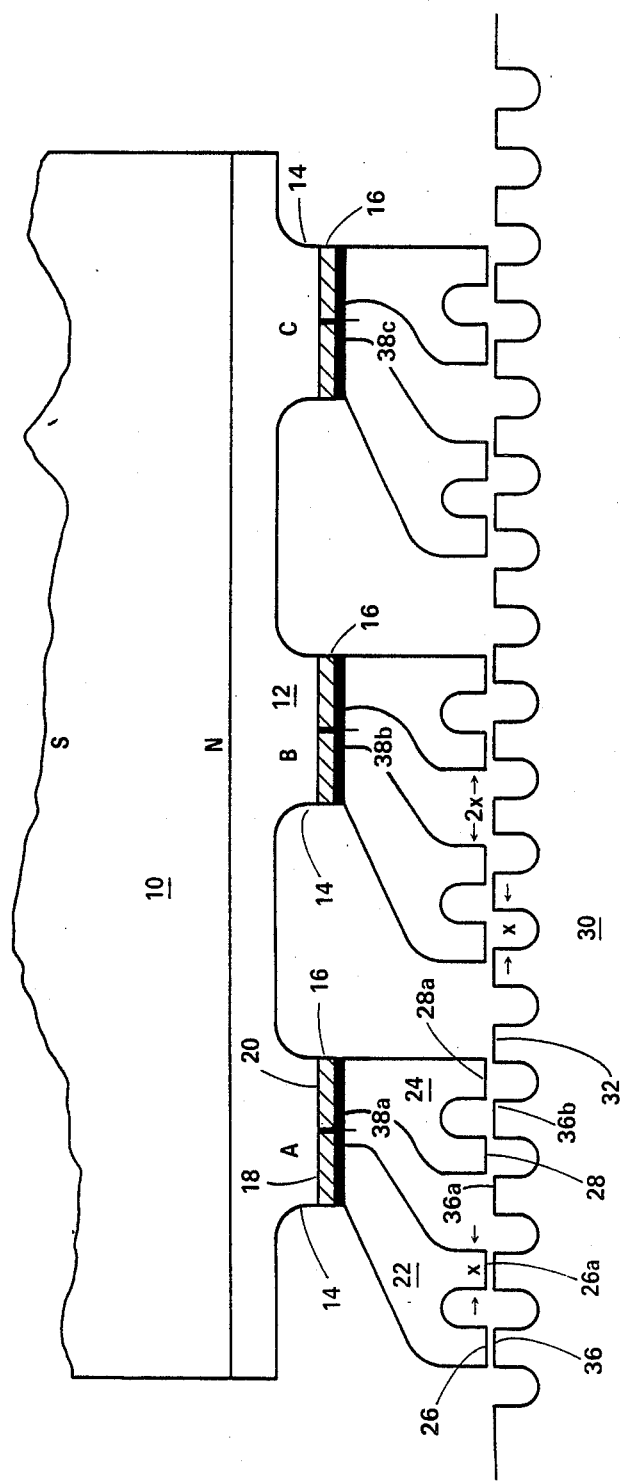
FIG. 1 is a cross sectional view of the sensor in accordance with the present invention and the transducer grid with which it cooperates.

Referring now to FIG. 1 there is shown a permanent magnet 10, shown with its north polarity oriented downwardly. This permanent magnet 10 can be fabricated of material that is dependent upon the size of the overall transducer. For relatively small dimensions, a permanent magnet made of rare earth material such as samarium cobalt or neodymium cobalt can be used. Larger transducer dimensions would allow the use of alnico magnets.

Connected to the permanent magnet 10 is a flux concentrator 12 made of magnetically soft material. The flux concentrator 12 can be attached to the permanent magnet 10 or be in very close proximity thereto by use of common bonding or mechanical attachment techniques. It is important not to allow the flux concentrator 12 to develop a high remanent magnetic field. The flux concentrator 12 is magnetically soft to allow the lines of flux in the permanent magnet to be concentrated through a vortex location in the concentrator shape, shown as reference numeral 14. Lines of flux from a relatively large area in the permanent magnet 10 are thereby concentrated by the flux concentrator 12 at three vortex locations 14 in the preferred embodiment, labelled A, B and C in FIG. 1. The flux concentrator 12 can have any number of vortex locations 14. It should be understood that the larger the number of vortex locations in a flux concentrator, the greater will be the resolution of the sensor.

At the end of each vortex location 14 is a bar of magneto resistive material 16, such as indium antimonide. This material has a specific electro mobility and therefore a specific resistance. Such material is described, for example, in U.S. Pat. No. 3,934,160, issued to Von Borcke and in an article entitled "Magnetoresistor Differential Sensor FP 210" by the same author in the Siemens Electronic Components Bulletin VIII (1973) No. 2, pp. 53–56. The properties of the magneto resistive element 16 allow an increase in magnetic field to result in an increase in resistivity in accordance with a parabolic function. In the preferred embodiment, the magnetic flux density in the region near the magneto resistive element 16 is approximately 0.24 Tesla.

At a certain portion of the resistivity vs. magnetic field curve, the relationship between magnetic field and resistivity approaches linearity. There is no need to work only within that linear region, however, because the parabolic equation is well understood and can be used downstream in further signal processing to obtain a correction for this nonlinearity with a high degree of accuracy.

The magneto resistive element 16 has two halves 18 and 20. Connected to the first half 18 of the magneto resistive element 16 is a flux coupler 22. The flux coupler 22 is irregularly shaped in a manner best suited to interface with a transducer grid, hereinafter described. The flux coupler 22 is made of magnetically soft material. Similarly, connected to the other half 20 of the magneto resistive element 16 is a second flux coupler 24. The flux couplers 22 and 24 are terminated in two flat feet 26, 26a and 28, 28a, respectively, each foot being offset from the other by the distance "x," as herein below described. The flux couplers 22 and 24 are offset from one another by the distance "2x." The vortex location 14, two halves 18 and 20 of the magneto resistive element 16 and two flux couplers 22 and 24 are compositely referred to as a transducer element or sensor unit.

Oppositely disposed to the three transducer elements is a transducer grid 30. The transducer grid 30 in the preferred embodiment has a plurality of uniformly dimensioned and uniformly spaced protuberances or teeth 32 which are flattened at their uppermost extremities and oriented to interact with the flux coupler feet 26, 26a, 28, 28a. The distance between transducer grid teeth 32, called grid spacing, is "x."

The transducer grid teeth 32 may be linearly oriented, circularly oriented or may be disposed in any other geometric pattern as is most suitable for measuring the relative position of two specified machine elements or members with respect to one another. It should be noted that, with respect to the transducer grid teeth 32, the flux couplers 22 and 24 are out of electrical phase and offset from one another by 180 electrical degrees. That is, flux coupler foot 26 is directly opposite transducer grid tooth 36 whereas flux coupler foot 28 is disposed precisely between two transducer grid teeth 36a and 36b. The reason for this phase relationship is to allow both halves 18 and 20 of the magnetic resistive element 16 to modulate flux distribution. One half 18 of the magneto resistive element 16 distributes the magnetic lines of flux exactly opposite to the magnetic lines of flux distributed by the other half 20 of the magneto resistive element 16.

The magneto resistive element 16, divided into halves 18 and 20, has an electrical connection point 38a at which an electrical wire, not shown, can be attached. This connection point 38a is referred to as an electrical center tap. An electrical signal generated at connection point 38a can then be used for further signal processing as hereinafter described.

In the preferred embodiment of the present invention, three sensor units are disposed opposite the transducer grid 30 for higher sensitivity and better resolution of position sensing information. Corresponding to electrical center tap 38a on the first sensor unit are electrical center taps 38b and 38c on the second and third sensor units, respectively, to which electrical wires can also be attached.

Figure 2A:
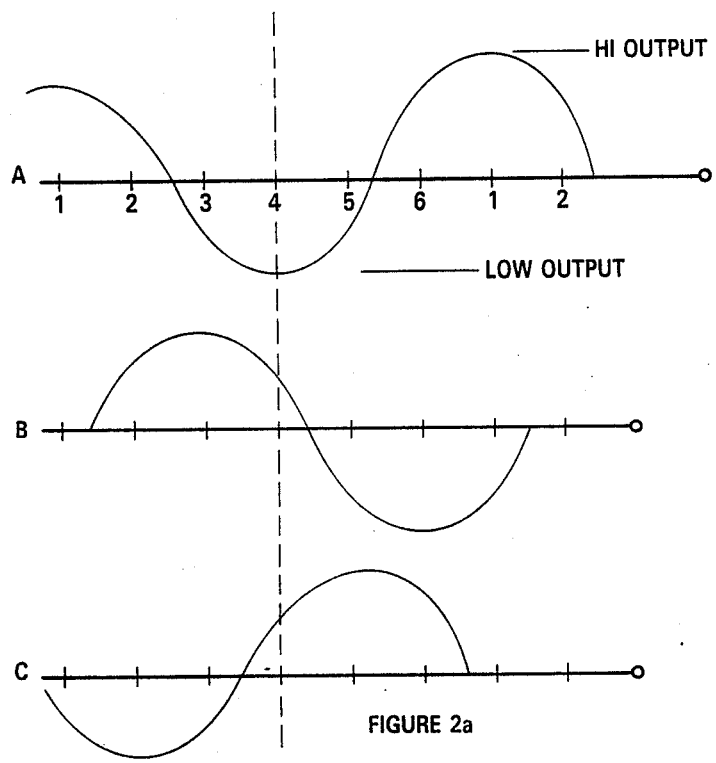
FIG. 2a is a graph of transducer signal output as a function of relative position.

The operation of the positioning sensors can best be described by referring also to FIG. 2a. There are shown graphs which represent the electrical signal output from the three center taps 38a, 38b and 38c (FIG. 1), respectively. The X axes of these graphs represent displacement or distance and the Y axis represents output voltage. The uppermost portion of the graph represents the output of sensor unit 38a. The center portion of the graph represents the output of sensor unit 38b. The lower portion of FIG. 2a represents the output of sensor unit 38c.

As the first sensor unit (FIG. 1) is caused to move relative to the transducer grid 30, the magnetic lines of flux generated by the permanent magnet 10 are received by the flux concentrator 12 and are directed and concentrated to the vortex location 14. The flux density of the two halves 18 and 20 of the magneto resistive element 16 is determined by the permeance along paths in flux couplers 22 and 24 respectively. The permeance of the two paths in flux couplers 22 and 24 is determined by the relative position of feet 26, 26a and 28, 28a to the transducer grid teeth 32.

In the position shown in FIG. 1, the magnetic field between the sensor unit and transducer grid 30 is strongest between flux coupler foot 26 and transducer grid tooth 36 as well as between foot 28 and the tooth oppositely disposed. It should be noted that magnetic permeance is a function of both the air gap or distance between foot 26 and tooth 36 and the surface area of the parallel surfaces (i.e., the projection of the surface of the foot 26 on the tooth 36). At this instant, the magnetic field between the pair of flux coupler feet 28, 28a and transducer grid tooth 36b is weakest. The electrical signal generated by the magneto resistive element 16 at the electrical center tap 38a is therefore relatively positive at this time, due to the resistance differential of magneto resistive element halves 18 and 20 which is generated by both flux couplers 22 and 24.

The electrical signal generated by the second magneto resistive element 16 at its electrical center tap 38b is shown in the center graph, FIG. 2a. It can be seen that the value of the electrical signal generated at electrical center tap 38b is generally different than that generated at electrical center tap 38a at any given instant. This is due to the fact that the first pair of flux couplers 22 and 24 is disposed out of phase relative to the second pair with respect to the transducer grid teeth 32.

Similarly, the electrical signal generated by the third magneto resistive element at its electrical center tap 38c is generally different than those generated at electrical center taps 38a and 38b at any given instant, as depicted by the lowermost portion of FIG. 2a.

As the three sensor units move relative to the transducer grid 30, the electrical signals generated by the electrical center taps 38a, 38b and 38c vary, but maintain their offset relationship with respect to one another.

Figure 2B:
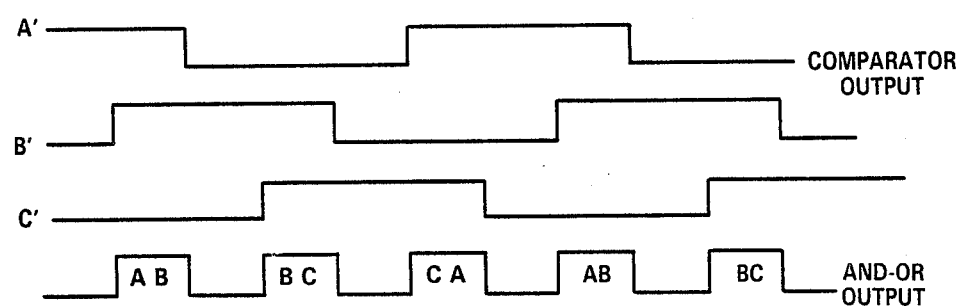
FIG. 2b is a square wave representation of the transducer signal output represented in FIG. 2a and of a comparator output signal generated by logic gates in accordance with the present invention.

The three signals can be processed (e.g., compared, added), resulting in the digital square wave graph depicted in FIG. 2b. It should be noted that the uppermost three square wave signals represent the comparator output of the signals from electrical center taps 38a, 38b and 38c respectively when compared to a reference voltage, not shown in FIG. 1, but represented by the X axes in FIG. 2a. By convention, the signal A, when compared to the reference voltage, becomes A'. Similarly, signal B compared to the reference voltage becomes B' and signal C becomes C'.

Figure 3:
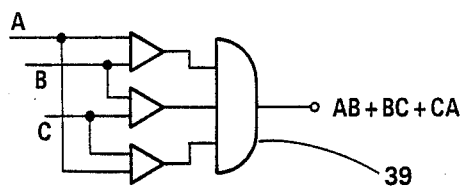
FIG. 3 is a schematic representation of a 3-input AND-OR gate.

Referring to FIG. 3, there is shown a three-input OR gate 39, the inputs of which are generated by three two-way AND circuits that logically combine the output signals shown in FIG. 2a. The sum of these three signals results in an output signal representing AB+BC+CA. The lowermost square wave graph of FIG. 2b represents the output of the circuit shown in FIG. 3.

Figure 4:
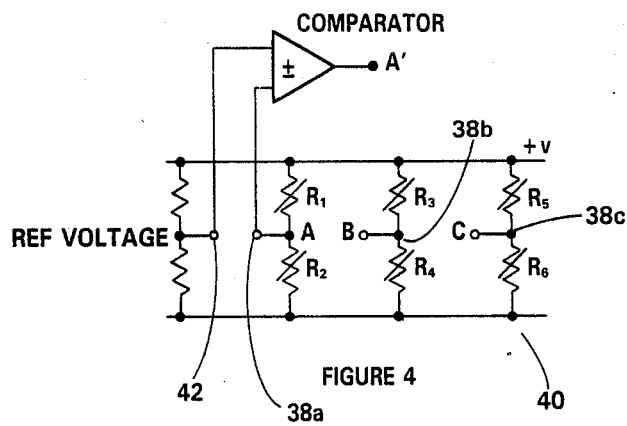
FIG. 4 is a schematic representation of a comparator with magneto resistive elements and a reference voltage source.

Referring now also to FIG. 4, there is shown an electrical schematic representation of the comparator used to generate the square wave signals shown in FIG. 2b. This comparator bridge circuit is identified generally as reference numeral 40. Variable resistors $R_1$ and $R_2$ represent the halves 18 and 20 of the magneto resistive element 16 (FIG. 1). Likewise, variable resistor pairs $R_3$, $R_4$ and $R_5$, $R_6$ represent respective halves of the second and third magneto resistive elements in the preferred embodiment. Reference voltage 42 is common for all three sensor units. The reference voltage source 42 is a resistive divider in the preferred embodiment, but it should be understood that a Zener diode or battery can also be used to supply voltage.

When the reference voltage 42 and the electrical center tap output 38a are equal, the comparator value A' is zero. Similarly, if $R_1$ has a higher value than $R_2$ the comparator output A' will be moved in a negative direction. When the electrical center tap voltage 38a is less than the reference voltage 42, the comparator output A' is zero. In all other cases the comparative value is proportionally positive. A +5 v power supply results in a signal output A', B' or C' of approximately 0.8 v peak to peak.

Figure 5:
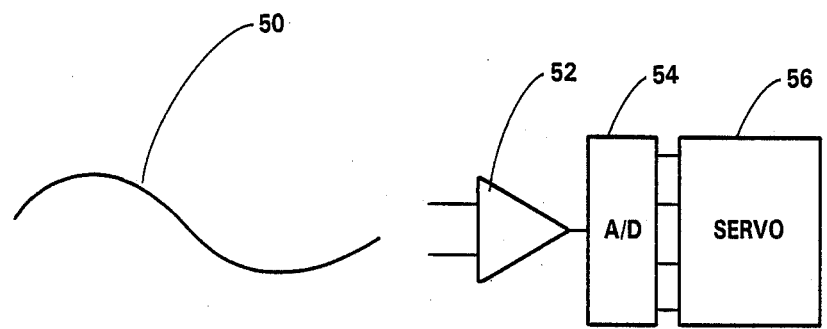
FIG. 5 is a block diagram representation of a high resolution positioning system and servo mechanism in accordance with the present invention.

Referring now to also FIG. 5, there is shown a block diagram of a system that incorporates the high output high resolution transducer of the present invention. The electrical analog signal 50 is sinusoidal in the preferred embodiment. This is the signal that is output from the electrical center tap of one of the sensor units (FIG. 1). The signal 50 is input to an amplifier 52 which, in turn, supplies an output signal to an analog to digital (A/D) converter 54. The A/D converter supplies a digital signal to a servo mechanism 56 used for positioning a movable member relative to a stationary member.

The system shown in FIG. 5 results in high resolution with a minimum amount of circuitry and with no need for a sophisticated A/D apparatus. To adapt the system for use with a plurality of sensor units, as is shown in the preferred embodiment (FIG. 1), requires a logic system capable of summing the signals A, B and C before further signal processing thereof. Such logic systems are well known in the art of digital or analog signal processing.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A high resolution positioning sensor for determining static and dynamic position comprising:
    (a) means for producing a magnetic field;
    (b) means operatively connected to said magnetic field producing means for concentrating lines of magnetic flux produced thereby;
    (c) a magneto resistive element operatively connected to said concentrating means, said magneto resistive element being adapted to change resistive properties as a function of magnetic flux density, and said magneto resistive element generating an electrical signal indicative of magnetic flux density;

(d) a reference position scale comprising a transducer grid having a plurality of substantially uniformly spaced protuberances, each of said protuberances having a predetermined width at its extremity;

(e) two flux couplers operatively connected to said magneto resistive element and being separated from one another by substantially twice said protuberance extremity width, said flux couplers being adapted to move relative to said reference position scale and being disposed out of phase with one another with respect to said plurality of protuberances of said transducer grid for modulating flux distribution between said concentrating means and said transducer grid so that said electrical signal represents the position of said reference position scale relative to said flux couplers irrespective of relative motion therebetween.

2. The high resolution positioning sensor in accordance with claim 1 wherein said flux couplers are disposed 180° out of phase with respect to one another.

3. The high resolution positioning sensor in accordance with claim 2 wherein said transducer grid is linear.

4. The high resolution positioning sensor in accordance with claim 2 wherein said transducer grid forms at least a portion of a curve.

5. A high resolution positioning sensor for determining static and dynamic position comprising:

(a) a magnetic field generator;

(b) at least two means operatively connected to said magnetic field generator for concentrating lines of magnetic flux produced thereby;

(c) a magneto resistive element operatively connected to each of said concentrating means, said magneto resistive elements being adapted to change resistive properties as a function of magnetic flux density, and said magneto resistive elements generating electrical signals indicative of magnetic flux density;

(d) a reference position scale having a predetermined dimensional periodicity and a plurality of teeth substantially uniformly spaced with respect to one another; and (e) two flux couplers each having an extremity, said flux couplers being offset with respect to one another at their respective extremities by substantially twice said predetermined dimensional periodicity, said flux couplers being operatively connected to each of said magneto resistive elements for modulating flux distribution therefrom and thereto so that said electrical signal represents the position of said reference position scale relative to said flux couplers irrespective of relative motion therebetween.

* * * * *